(12) United States Patent
Bairavasundaram et al.

(10) Patent No.: US 8,924,658 B1
(45) Date of Patent: Dec. 30, 2014

(54) DYNAMIC STORAGE MANAGEMENT USING VIRTUAL STORAGE APPLIANCES

(75) Inventors: Lakshmi Narayanan Bairavasundaram, Sunnyvale, CA (US); Garth Goodson, Fremont, CA (US); Vipul Mathur, Bangalore (IN); Shankar Pasupathy, Milpitas, CA (US); Gokul Soundararajan, Sunnyvale, CA (US); Kiran Srinivasan, Sunnyvale, CA (US); Kaladhar Voruganti, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 282 days.

(21) Appl. No.: 13/032,409

(22) Filed: Feb. 22, 2011

(51) Int. Cl.
*G06F 12/00* (2006.01)
(52) U.S. Cl.
USPC .................... 711/154; 711/E12.001; 709/226
(58) Field of Classification Search
None
See application file for complete search history.

(56) References Cited

U.S. PATENT DOCUMENTS

| | | | |
|---|---|---|---|
| 2008/0005297 A1* | 1/2008 | Kjos et al. | 709/223 |
| 2008/0195369 A1* | 8/2008 | Duyanovich et al. | 703/22 |
| 2008/0262890 A1* | 10/2008 | Korupolu et al. | 705/8 |
| 2012/0023209 A1* | 1/2012 | Fletcher et al. | 709/223 |

OTHER PUBLICATIONS

Anderson et al; Interposed Request Routing for Scalable Network Storage; Feb. 2002; ACM Transactions on Computer Systems, vol. 20, No. 1; pp. 25-48.*

* cited by examiner

*Primary Examiner* — Christian P Chace
*Assistant Examiner* — Eric Loonan
(74) *Attorney, Agent, or Firm* — Perkins Coie LLP (57) ABSTRACT

The techniques introduced here provide for efficient management of storage resources in a modern, dynamic data center through the use of virtual storage appliances. Virtual storage appliances perform storage operations and execute in or as a virtual machine on a hypervisor. A storage management system monitors a storage system to determine whether the storage system is satisfying a service level objective for an application. The storage management system then manages (e.g., instantiates, shuts down, or reconfigures) a virtual storage appliance on a physical server. The virtual storage appliance uses resources of the physical server to meet the storage related needs of the application that the storage system cannot provide. This automatic and dynamic management of virtual storage appliances by the storage management system allows storage systems to quickly react to changing storage needs of applications without requiring expensive excess storage capacity.

34 Claims, 9 Drawing Sheets

DYNAMIC STORAGE MANAGEMENT USING VIRTUAL STORAGE APPLIANCES

FIELD OF THE INVENTION

At least one embodiment of the present invention pertains to management of a storage system in relation to performance of the storage system with respect to a service level objective, and more particularly, to dynamic management of a storage system, through the use of a virtual storage appliance, in response to changes in performance of the storage system with respect to a service level objective.

BACKGROUND

A modern data center can include a large number of storage systems, including storage controllers and mass storage devices, and physical servers for hosting applications which access the storage systems. Today's data centers, especially in cloud computing environments, typically have large, multi-tenant systems, i.e., multiple organizations and/or applications share the same underlying processing and storage hardware. The physical servers that host the applications in such environments often include hypervisors, with the individual applications and their operating systems running as virtual machines (VMs) logically on top of the hypervisors.

These data centers are often extremely dynamic in their makeup and usage. For example, the set of applications running on the physical servers in the data center often changes due to the multi-tenant nature of the data center. This dynamism typically results in a fluctuating storage workload for the data center. Further, the storage workload for the data center often changes over time regardless of whether the set of applications changes, e.g., the data center has a peak storage workload during a specific time of day. The difference between an average and peak load can be substantial. Further, in order to balance utilization of processing and storage resources (or for other management reasons), applications may be migrated between physical servers and sometimes between data centers, adding to the dynamic nature of the data center.

Conventional storage management systems are not capable of efficiently handling the dynamic nature of today's data centers. Typically, conventional storage management systems rely on the availability of pre-allocated resources, e.g., processors, memory, flash storage, disk drives, network, etc., often in the form of entire storage systems, to handle the storage needs of an application. If the allocated resources do not meet the storage demand for the data center, typically additional hardware resources are installed to meet the demand. Installing additional hardware resources can be time consuming, labor intensive, and expensive. In some cases, entire storage systems are purchased and installed in the data center to compensate for a peak load that is slightly over the capacity of the previously allocated resources. As a result, conventional storage management techniques result in either an abundance of physical resources that are not efficiently being used (i.e., excess capacity) or, when demand exceeds capacity, cannot react quickly enough to reasonably satisfy the demand.

SUMMARY

The techniques introduced here provide for efficient management of storage resources, such as may be used in a modern, dynamic data center, through the use of virtual storage appliances. Virtual storage appliances perform storage system operations and can execute in or as a virtual machine on a hypervisor. The techniques according to one embodiment include a system and method for managing a dynamic data center by monitoring a storage system to determine whether the storage system is satisfying a service level objective for an application. The storage management system then instantiates, shuts down, or modifies a virtual storage appliance on a physical server if there is a determination that the service level objective is not being satisfied. The virtual storage appliance can then use resources of the physical server to meet the storage related needs of the application that the storage system cannot provide. This automatic and dynamic management of virtual storage appliances by the storage management system allows storage systems to react quickly and automatically to changing storage needs of applications without requiring significant expensive excess storage capacity to be provided.

A storage management system such as introduced here, in one embodiment, includes a monitoring engine to gather data related to performance of the storage system. The storage management system further includes a detection engine to determine from the gathered data whether the storage system is satisfying a service level objective for an application that accesses the storage system. The storage management system, in one embodiment, includes scenario data that defines actions to be taken in response to an alert from the detection engine. The storage management system further includes a decision engine to determine, based on information from the detection engine and the scenario data, an action to be taken in managing the storage system to meet the storage related needs of the application.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
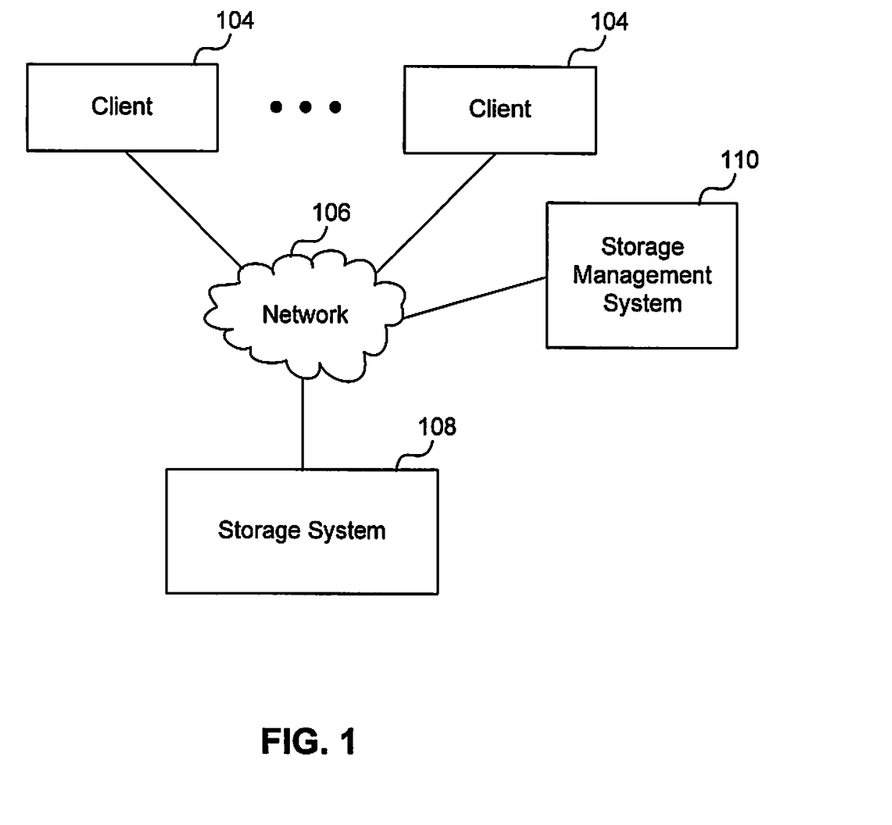
FIG. 1 is a block diagram of an example data center with network storage including a client, a storage system, and a storage management system.

FIG. 1 shows an example of a data center with network storage, which includes a plurality of client systems 104, a storage system 108, a storage management system 110 and a network 106 connecting the client systems 104, the storage system 108, and the storage management system 110. The data center is described in more detail below with reference to FIG. 2. The client systems 104 are connected to the storage system 108 via an interconnect such as the network 106, which can be, for example, a packet-switched network, such as a local area network (LAN) or a wide area network (WAN).

Various functions and configuration settings of the storage system 108 can be controlled by a user, e.g., a storage administrator, through a storage management system 110 coupled to the network 106. Further, the storage management system 110 includes logic to monitor and configure storage resources in the storage system 108 to meet the needs of client applications 104. As shown in FIG. 1, the storage management system 110 is connected to the storage system 108 through the network 106. However, in another embodiment the storage management system 110 can be part of the storage system 108.

Figure 2:
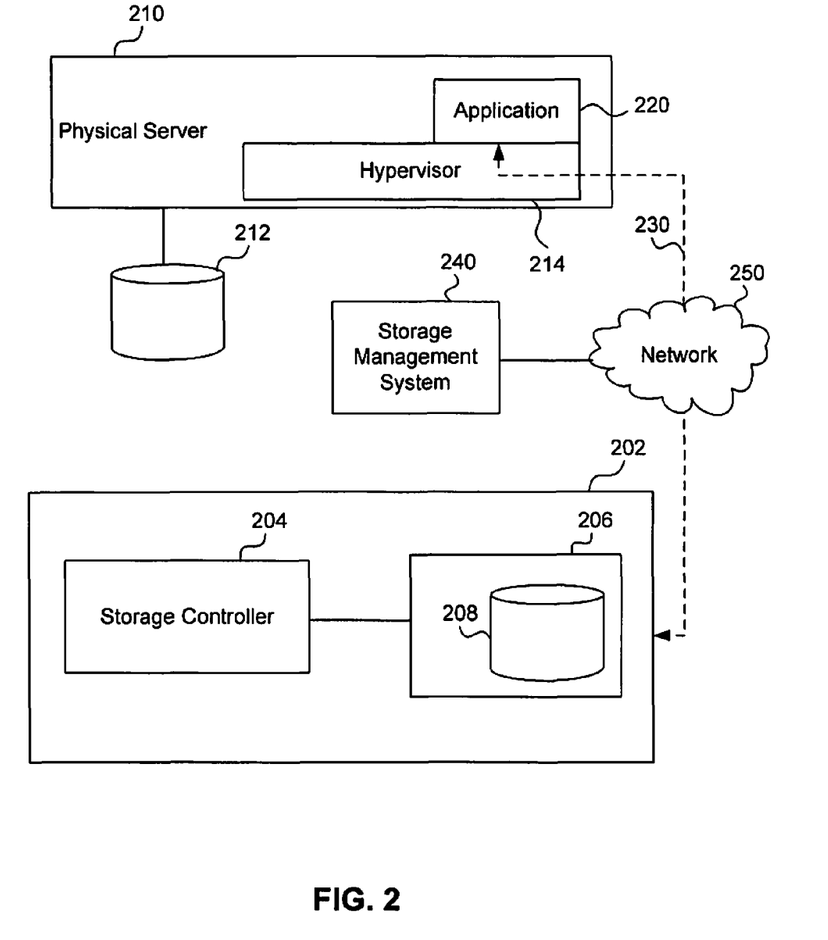
FIG. 2 is a block diagram of a data center.

FIG. 2 is a block diagram of a data center. The data center includes a storage system 202 and a physical server 210. Physical server 210 is configured to host client application 220 that accesses the storage resources of the storage system 202. As shown in FIG. 2, the storage system 220 includes a storage controller 204 which is coupled to a mass storage subsystem 206. The mass storage subsystem includes a number of mass storage devices 208, such as disks, tapes, solid state drives, etc. Alternatively, some or all of the mass storage devices 208 can be other types of storage, such as flash memory, solid-state drives (SSDs), tape storage, etc. However, to simplify description, the storage devices 208 are assumed to be disks herein.

The storage controller 204 can be, for example, one of the FAS-series of storage server products available from NetApp®, Inc. Further, the storage controller 204 can be connected to the disks 208 via a switching fabric (not shown), which can be a Fiber Distributed Data Interface (FDDI) network or Small Computer System Interface (SCSI) connection, for example. It is noted that, within the data center, any other suitable number of storage controllers and/or mass storage devices, and/or any other suitable network technologies, may be employed.

The storage controller 204 can make some or all of the storage space on the mass storage devices 208 available to the client systems 104 and applications 220 in a conventional manner. For example, each of the mass storage devices can actually be an individual disk or other device, a group of disks or other devices (e.g., a RAID group), or any other suitable mass storage device(s). The storage controller 204 can communicate with the client systems 104, the storage management system 110, and the physical server 210 according to any one or more well-known protocols, such as Network File System (NFS), Common Internet File System (CIFS), Hypertext Transfer Protocol (HTTP), Internet Small Computer System Interface (iSCSI), or NetApp Remote Volume (NRV), to make data stored on the disks 208 available to clients 104 and/or applications 220. The storage controller 204 can present or export data stored on the disks 208 as storage objects, for example, volumes, to each of the client systems 104 or applications 220.

The physical server 210 includes resources, e.g., one or more processors, memory, local storage, etc., (not shown) to host applications 220 that access the storage resources of the data center. The physical server 210 includes a hypervisor 214 with individual applications, such as application 220, running in virtual machines logically on top of the hypervisor. The physical server 210 is coupled with the storage system 202 to allow applications 220 to access storage related resources of the storage system 202. An example data access path 230 between an application and the storage system is shown in FIG. 2. The data access path, in the example of FIG. 2, is through a physical interconnect, for example, network 250. The data center further includes a storage management system 240 connected with the physical server 210 and storage system 202 through the interconnect 250. In one embodiment, the data center includes a data interconnect and a management interconnect.

Figure 3:
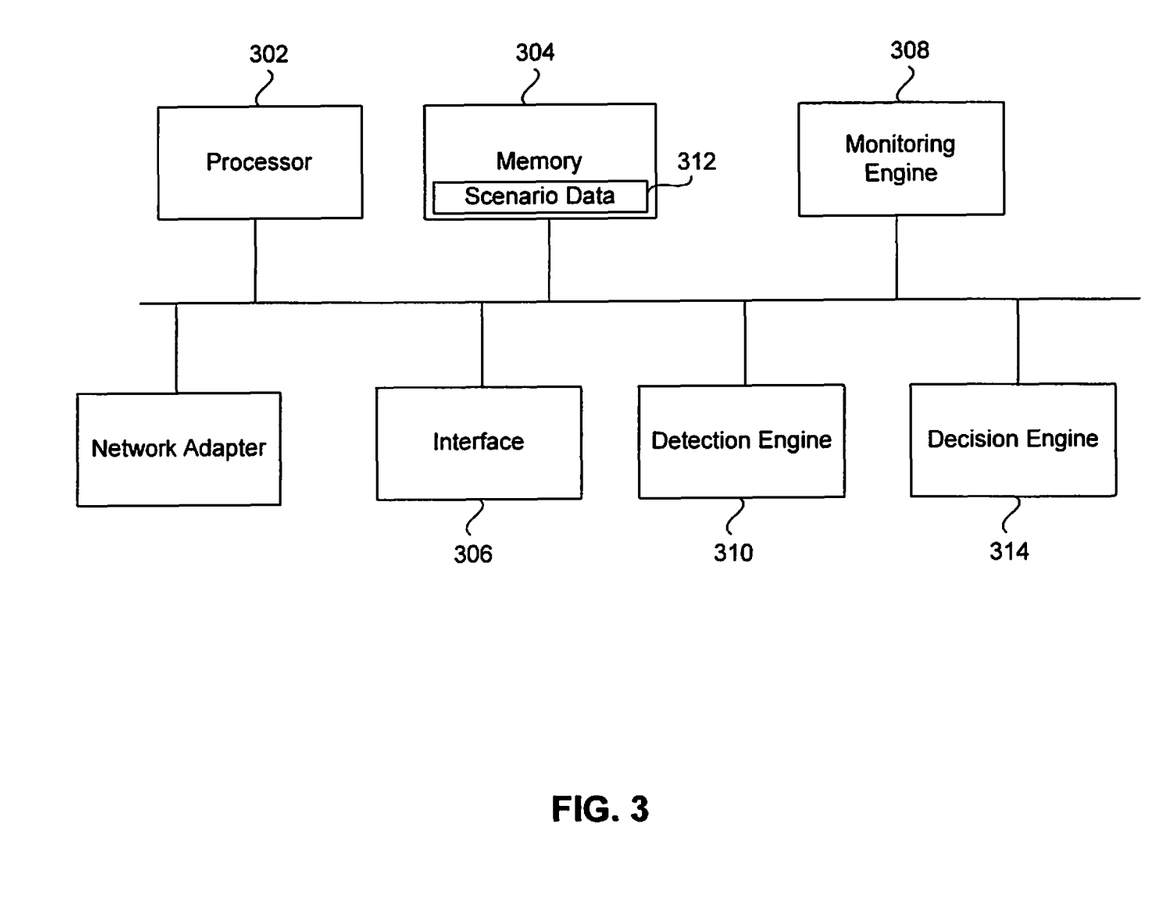
FIG. 3 is a block diagram of a storage management system.

FIG. 3 is a block diagram of a storage management system according to the techniques introduced here, for example the storage management system 110 of FIG. 1. The storage management system includes, among other things, a processor 302, a memory 304, a user interface 306, a monitoring engine 308, a detection engine 310, a scenario table 312, and a decision engine 314. The elements of the storage management system can be implemented by programmable circuitry programmed or configured by software and/or firmware, or they can be implemented by entirely by special-purpose "hardwired" circuitry, or in a combination thereof. In the former case, elements 306, 308, 310, and 314 can be implemented within processor 302.

The interface 306 allows a user to specify a service level objective for an application or set of applications. A service level objective is a specific measurable performance characteristic that specifies what service is to be provided to the application or set of applications. Common service level objectives are, for example, availability, throughput, response time, or quality. The user interface 306 can be any suitable type of user interface, e.g., a graphical user interface or a command line interface.

The monitoring engine 308 gathers data relating to resource allocation of a storage system, and utilization of those resources, as well as performance data of the storage system relating to service level objectives. Examples of data gathered may include amount of memory used by the buffer cache, cache hit rate for I/O requests, workload on individual disk drives, time taken for disk access, how busy the processor is, etc. The monitoring engine 308 also monitors resource allocation on a physical server, such as server 210, utilization of the physical server resources, the hypervisor 214, and the virtual storage appliances, as described below.

The detection engine 310 analyzes the data gathered by the monitoring engine 308 and triggers an alert if service level objectives are not being satisfied or if resources are not being efficiently utilized. The decision engine 314, in response to an alert from the detection engine 310, utilizes the scenario data 312 to decide an action that the storage management system should take in response to the alert. In one embodiment, the scenario data 312 is a data structure stored in memory 304 of the storage management system. The scenario data 312 can be stored as a table or any other known or convenient type of data structure. The scenario data 312 contains information outlining an action to take in response to a defined scenario.

If a storage system is not able to meet the applicable service level objective with its current resource allocation, the storage management system manages one or more virtual storage appliances (VSAs), as described below, to dynamically supplement or replace the storage system to meet the service level objective for an application. VSAs are appliances that perform storage system operations and can execute in or as a virtual machine on a hypervisor. There can be many types of virtual storage appliances. Endpoint VSAs, for example, can use direct-attached storage (e.g., disks or flash memory) on a physical server to store data in order to satisfy a service level objective, essentially dynamically adding storage resources to the storage system. Caching VSAs use storage on a physical server to cache data stored on the storage system or, in one embodiment, an endpoint VSA. Compression VSAs can remove redundant data being stored to a storage system, e.g., using deduplication techniques. Backup VSAs can initiate and manage backup of data from one storage system to another and restore the backed up data when needed.

Figure 4:
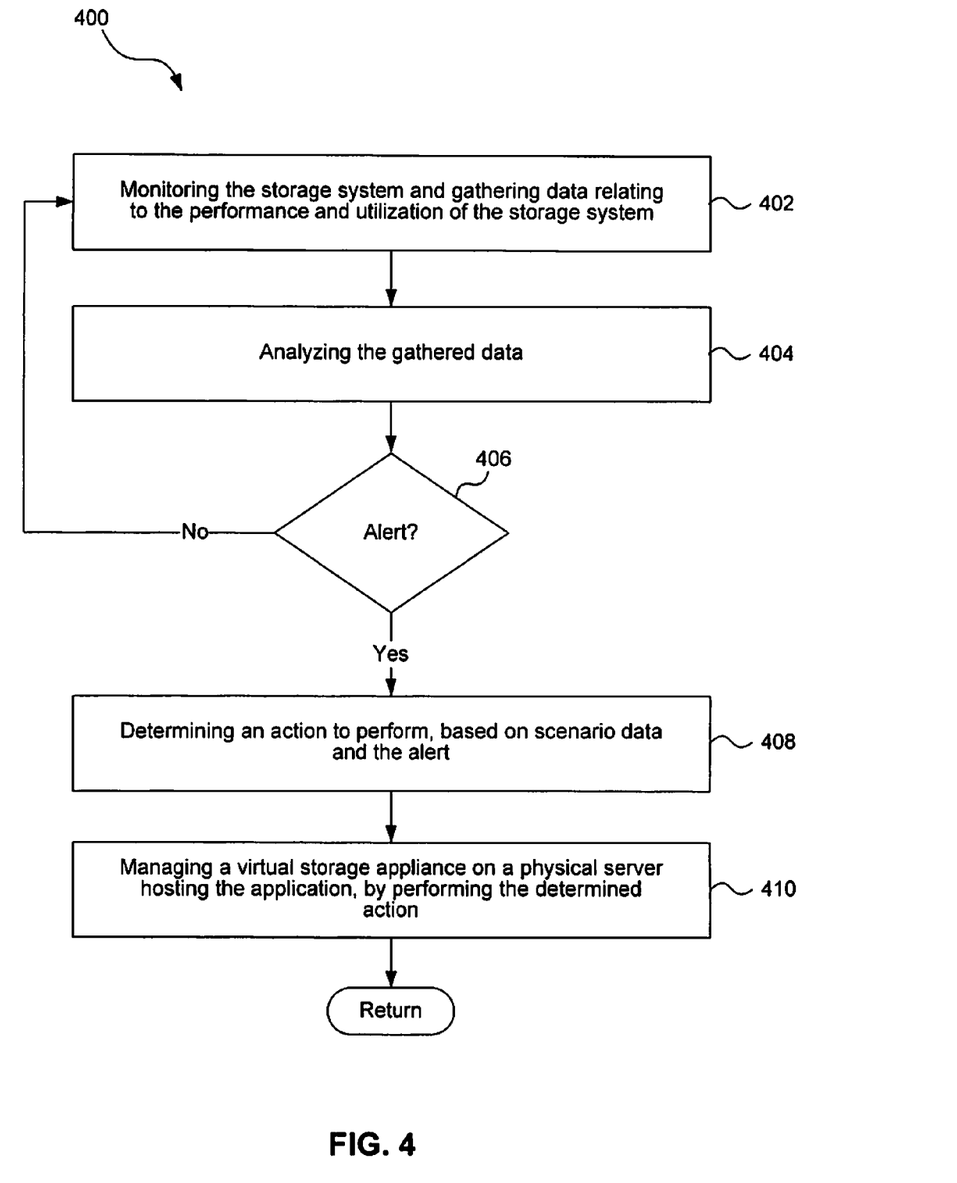
FIG. 4 is a flow diagram of a process for managing a storage system automatically to meet service level objectives.

FIG. 4 is a flow diagram of a process 400 for managing a storage system automatically to meet service level objectives, according to the techniques introduced here. Note that at least some of the operations associated with this process can potentially be reordered, supplemented, or substituted for, while still performing the same overall technique.

The process begins, at step 402, with the monitoring engine 308 of the storage management system monitoring the storage system and gathering data relating to the performance and utilization of the storage system. For example, the monitoring engine may obtain response time measurements for the I/O requests of a particular client. At step 404, the detection engine 310 analyzes the data gathered by the monitoring engine 308 and at decision step 406 determines whether to trigger an alert. For example, the detection engine 310 may compare one or more performance values observed by the monitoring engine 308 to one or more corresponding threshold performance values that represent specific service level objectives. Based on each comparison of the observed performance value to the corresponding threshold performance value, the detection engine 310 either triggers an alert or continues to analyze data gathered by the monitoring engine 308. An example of such a comparison is checking whether the measured response time of I/O requests is lower than the maximum response time specified in the service level objective. Another example is checking whether the measured throughput for I/O requests is higher than the minimum throughput specified in the service level objective.

In response to an alert from the detection engine 310, the decision engine 314 determines at step 408, based on the alert and a scenario represented in the scenario data 312, what action the storage management system should take. In one embodiment, the decision engine 314 uses heuristic methods to determine an efficient action to perform in response to the alert. For example, the storage management system can instantiate, shut down, or reconfigure a VSA, or multiple VSAs, such that a service level objective for an application is satisfied. The storage management system then performs the action specified in the scenario data 312 at step 410. The actions the storage management system may take are described in further detail in the example below. Importantly, this entire process can be performed without any human input during the process.

Figure 5:
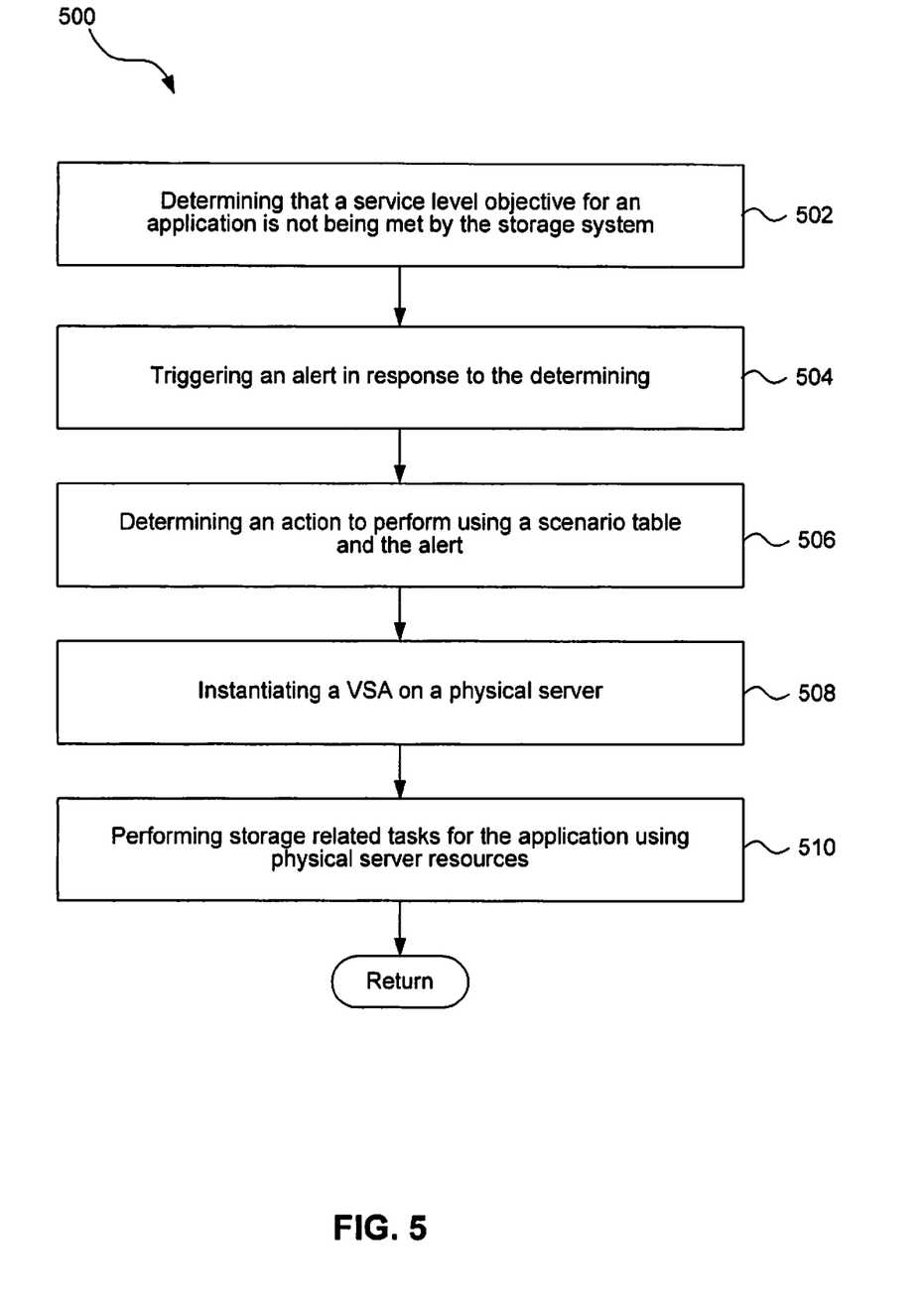
FIG. 5 is a flow diagram of a process for instantiating a virtual storage appliance to perform storage related operations using resources of a physical server.

FIGS. 5-8 illustrate how the storage management system can dynamically manage a storage system. Assume for this example that the storage management system is monitoring a storage system that is providing storage related services for an application running on a physical server. FIG. 5 is a flow diagram of a process 500 for instantiating a virtual storage appliance to perform storage related operations using resources of a physical server. It should be understood that at least some of the operations associated with this process can potentially be reordered, supplemented, or substituted for, while still performing the same overall technique.

At step 502, the detection engine 310 of the storage management system determines that a service level objective for the application is not being met by the storage system. For example, the storage system may be receiving a large number of read requests and may not be able to perform at the required input/output rate for the application. At step 504, the detection engine 310 triggers an alert that the storage system has reached its maximum read rate performance limits and therefore cannot satisfy a service level objective for the application. At step 506, the decision engine 314, in response to receiving the alert, references scenario data 312, such as example table below, to determine what action the storage management system should take.

| Option | Scenario | Action |
| --- | --- | --- |
| 1 | A new application has been created with low performance and low reliability needs, e.g., to store temporary data. | Instantiate an Endpoint VSA on a physical server containing direct attached storage, and using the physical server storage to meet the needs of the application. |
| 2 | A new application has been created with high performance and high reliability needs. | Allocate storage resources on a storage system. Optionally, create a Caching VSA and set up the application to use the cache which in turn accesses the storage system. |
| 3 | A new application has been created with low performance and medium-high reliability needs. | Instantiate an Endpoint VSA on a server and set up a replication/backup relationship with a storage system. This VSA is now both an Endpoint and a Backup VSA. |
| 4 | The amount of space available on the storage system has been reduced significantly. | Identify the application on the storage system which will benefit most from compression and dynamically instantiate a Compression VSA, and introduce the VSA in the data access path of the application so that the VSA can compress data that has been stored and is being stored. |
| 5 | New storage has been added to the storage system, thereby allowing data to be stored without compression. An application's performance needs have also been affected by the introduction of compression. | Initiate decompression of the entire set of application data stored by the Compression VSA, re-route applications to directly use the storage system, and finally shut down the VSA. |
| 6 | The storage system has reached its performance limits and the performance objectives of some applications are not being met. | Identify an application on the storage system for which a cache will reduce the workload as needed on the storage system. Create a Caching VSA for the application and re-route the application's data access path to use the cache. |
| 7 | The buffer cache hit rate in the VSA (especially Caching or Endpoint) is lower than needed. | Increase the amount of memory resources allocated to the VSA by issuing commands to the hypervisor and the VSA. |
| 8 | The buffer cache hit rate in the VSA (especially Caching or Endpoint) is higher than needed. | Reduce the memory allocated to the VSA by issuing commands to the hypervisor and the VSA. |
| 9 | The application is no longer cacheable (e.g., the physical server does not have sufficient storage for the amount of data cached by the application) for the Caching VSA. | Re-route the application to use the storage system directly and then shutdown the Caching VSA. |
| 10 | The storage system now has sufficient performance margin and one or more of its applications are using Caching VSAs. | Re-route the application to use the storage system directly and then shutdown the Caching VSA. |

The decision engine 314, based on heuristic methods for example, may choose, for example, option "6" in the scenario table above to improve the performance of the storage system. Accordingly at step 508, the storage management system instantiates a Caching VSA on the physical server to buffer (including proxying storage I/O operations) data for the application so that the application's minimum input/output (read/write) rate will be satisfied. In one embodiment, the storage management system issues a command to re-route the application's data access path to use the Caching VSA. The details of instantiating a VSA are not germane to this description; a known or convenient process for instantiating a VM can be used. Finally, at step 510, the VSA performs storage system operations, e.g., buffering data between the application and the storage system, to satisfy the service level objective for the application.

Figure 6:
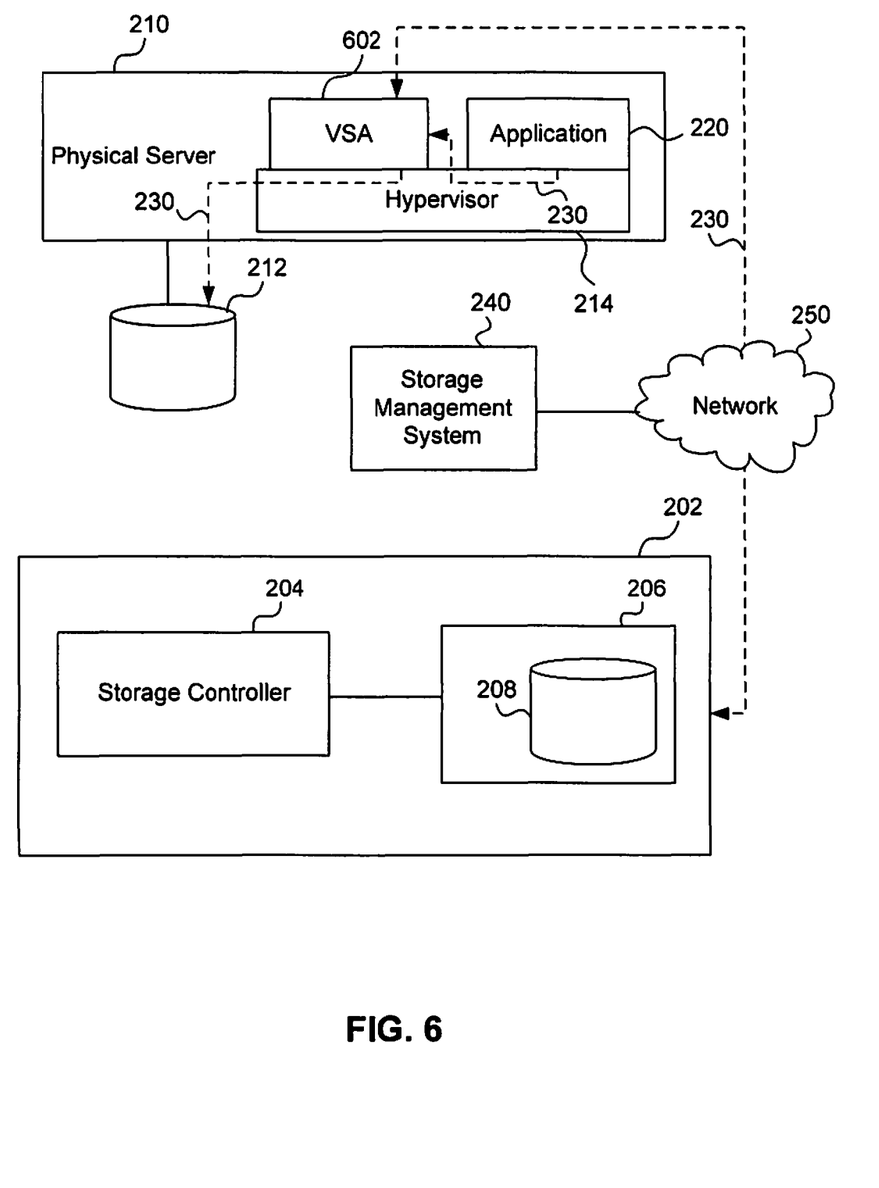
FIG. 6 is a block diagram of a data center including a virtual storage appliance.

FIG. 6 is a block diagram of an example data center including a virtual storage appliance. The data center depicted in FIG. 6 is similar to the data center depicted in FIG. 2 with the addition of the VSA 602 running on the physical server 210. While FIG. 6 depicts a data center having a single physical server, a data center can have multiple physical servers, each running one or more VSAs. Further, the data access path 230 has been modified so that storage operations requested by the application 220 run through the VSA 602 instead of directly to the storage system 202. The VSA 602 uses resources of the physical server 210, e.g., processor, disk, and/or memory, to perform caching operations and/or other storage system operations, such that service level objectives for the application 220 are met. While it is shown in FIG. 6 that the VSA is running on the same physical server as the application, the VSA can run on any physical server connected with the storage system and the physical server hosting the application. Further, in one embodiment, the VSA can run in a storage system, such as in storage controller 204, instead of in a separate physical server.

Figure 7:
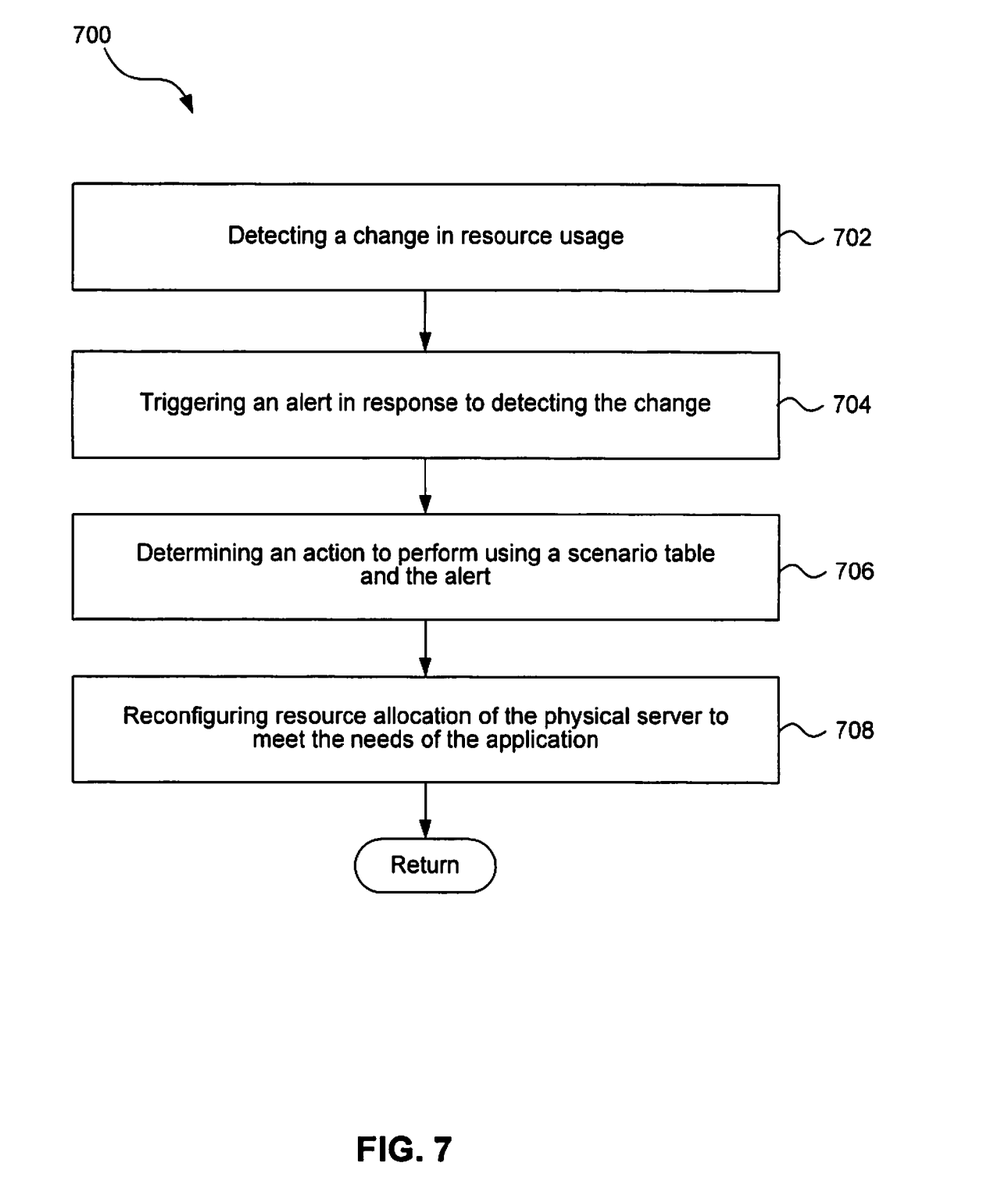
FIG. 7 is a flow diagram of a process for reconfiguring a virtual storage appliance automatically to satisfy a service level objective.

After the VSA has been instantiated, the monitoring engine 308 of the storage management system monitors both the storage system 202 and the VSA 602 for conditions such as mentioned above (e.g., see example table). Referring now to FIG. 7, a flow diagram of a process 700 for reconfiguring a virtual storage appliance automatically to satisfy a service level objective is shown. At step 702, the detection engine 310 detects a change in resource usage. For example, the detection engine 310 may detect that the buffer cache hit rate in the VSA is too low, i.e., insufficient resources are allocated to the VSA and the application is accessing the storage system directly, resulting in performance loss. In response to detecting the low hit rate, the detection engine 310 triggers an alert at step 704.

At step 706, in response to the alert, the decision engine 314 references the scenario data 312 to determine what action the storage management system should take. As noted above, the decision engine 314 can use heuristic methods to determine the most appropriate action. For example, the decision engine 314 may choose option "7" of the example scenario data 312 and decide to increase the physical server resources allocated to the VSA in order to increase the hit rate. Accordingly, at step 708, the storage management system reconfigures resource allocation of the physical server to increase the resources allocated to the VSA to meet the needs of the application. In one embodiment, the storage management system issues a command to the hypervisor to reconfigure the resource allocation. The hypervisor then performs the reconfiguration.

Figure 8:
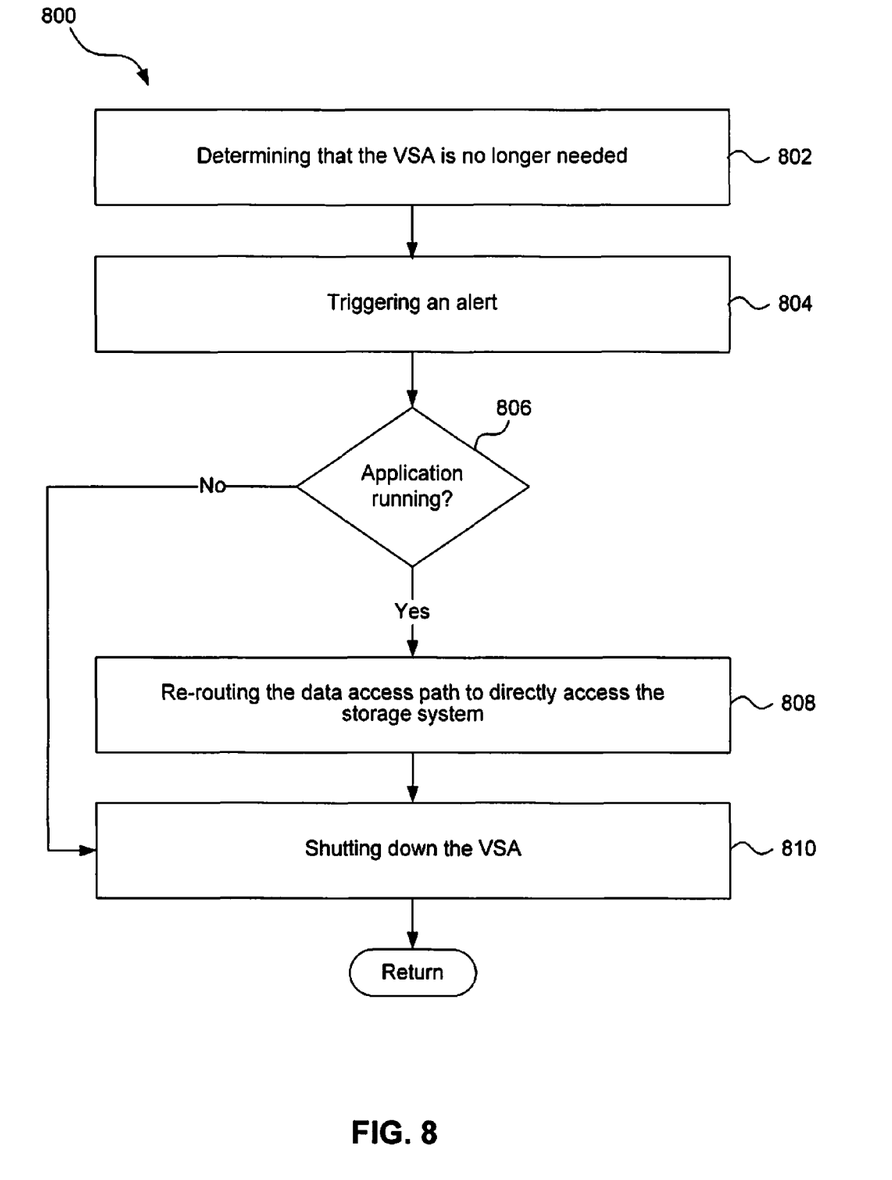
FIG. 8 is a flow diagram of a process for shutting down a virtual storage appliance automatically to satisfy a service level objective.

Referring now to FIG. 8, a flow diagram of a process 800 for shutting down a virtual storage appliance automatically to satisfy a service level objective is shown. At step 802, the detection engine 310 determines, from data gathered by the monitoring engine 308, that the VSA is no longer needed. This could occur, for example, when the application has been shut down or the storage system has become less busy, such that sufficient resources are available on the storage system to satisfy the service level objectives of the application without help from the VSA. The detection engine 310 triggers, at step 804, an alert and the decision engine 314 references the scenario data 312 to determine the most appropriate action to take in response to the alert. At decision step 806, if the application is running (i.e., still requires storage system operations), the storage management system re-routes the data access path of the application, at step 808, to directly access the storage system and shuts down the VSA at step 810. At decision step 806, if the application is not running (i.e., no longer requires storage system operations), the storage management system shuts down the VSA at step 810.

Figure 9:
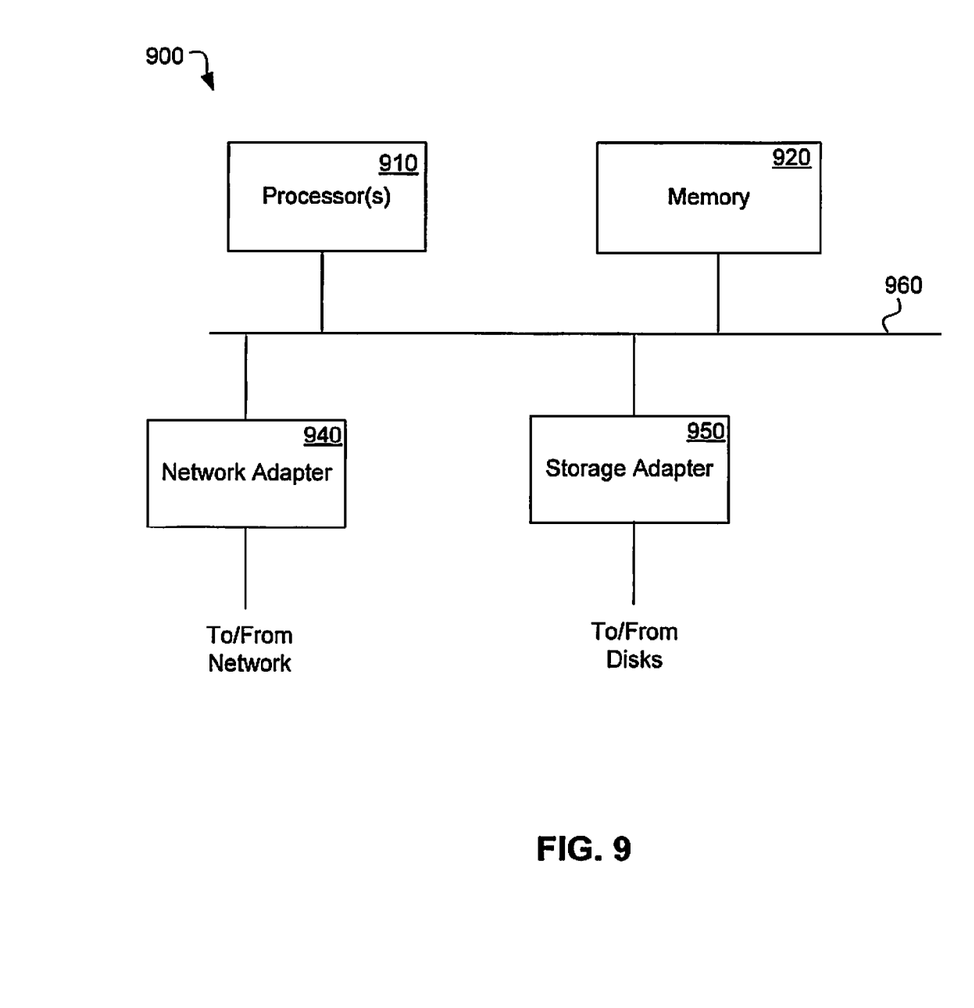
FIG. 9 is a block diagram of a system that can be used to implement components of a network storage system.

FIG. 9 is a block diagram of a system 900 that can be used to implement components of a network storage system. For example, the system of FIG. 9 can be used to implement a client system, the storage management system, the storage controller, or the physical server.

In an illustrative embodiment, the system 900 includes a processor subsystem 910 that includes one or more processors. The system 900 further includes memory 920, a network adapter 940, and a storage adapter 950, all interconnected by an interconnect 960.

The memory 920 illustratively comprises storage locations that are addressable by the processor(s) 910 and adapters 940 and 950 for storing software program code and data associated with the techniques introduced here. The processor 910 and adapters 940 and 950 may, in turn, comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 940 includes a plurality of ports to couple the system 900 with one or more other systems over point-to-point links, wide area networks, virtual private networks implemented over a public network (Internet) or a shared local area network. The network adapter 940 thus can include the mechanical components and electrical circuitry needed to connect the system 900 to the network 106. Illustratively, the network 106 can be embodied as an Ethernet network or a Fibre Channel (FC) network. One or more systems can communicate with other systems over the network 106 by exchanging packets or frames of data according to pre-defined protocols, such as TCP/IP.

The storage adapter 950 cooperates with the operating system to access information on attached storage devices. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. The storage adapter 950 includes a plurality of ports having input/output (I/O) interface circuitry that couples with the disks over an I/O interconnect arrangement, such as a conventional high-performance, Fibre Channel (FC) link topology.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising;
monitoring, by a storage management system, a storage system to determine whether the storage system is satisfying a service level objective for an application;
determining, by the storage management system, from said monitoring, that the storage system is not satisfying the service level objective for the application; and
in response to a determination that the storage system is not satisfying the service level objective:
referencing scenario data corresponding to the service level objective for the application;
identifying a virtual storage appliance configuration and a virtual storage appliance action corresponding to the scenario data;
instantiating, by the storage management system, a virtual storage appliance according to the virtual storage appliance configuration;
causing the virtual storage appliance action to be performed by the virtual storage appliance to satisfy the service level objective, the virtual storage appliance comprising a virtual machine on a hypervisor configured to execute the virtual machine;
modifying a data access path between the application and a physical resource to pass through the virtual storage appliance;
monitoring the virtual storage appliance and the application to detect a change in resource usage;
rerouting the data access path such that the application directly accesses the physical resource based upon a detected change in resource usage; and
shutting down the virtual storage appliance after rerouting the data access path.

2. The method of claim 1 wherein managing the virtual storage appliance includes instantiating the virtual storage appliance on a physical server in response to an indication that the storage system is not satisfying the service level objective for the application.

3. The method of claim 1 wherein managing a virtual storage appliance includes shutting down the virtual storage appliance in response to a determination that the storage system is able to satisfy the service level objective without the virtual storage appliance.

4. The method of claim 1 wherein managing the virtual storage appliance includes reconfiguring the virtual storage appliance in response to a change in resource usage by the application.

5. The method of claim 4 wherein reconfiguring the virtual storage appliance includes increasing resources allocated to the virtual storage appliance.

6. The method of claim 4 wherein reconfiguring the virtual storage appliance includes decreasing resources allocated to the virtual storage appliance.

7. The method of claim 1 wherein the virtual storage appliance comprises an end-point virtual storage appliance, a caching virtual storage appliance, a compression virtual storage appliance, or a backup virtual storage appliance.

8. The method of claim 7, further comprising, heuristically determining what type of virtual storage appliance will satisfy the service level objective.

9. The method of claim 7, wherein the end-point virtual storage appliance satisfies an availability service level objective by using resources of a physical server to store data for the application in response to the storage system not having capacity to store the data.

10. The method of claim 7, wherein the caching virtual storage appliance satisfies an input/output service level objective by using resources of a physical server to cache data along a data access path between the application and the storage system to increase an input/output rate in response to the storage system not meeting a defined input/output rate.

11. The method of claim 7, wherein the compression virtual storage appliance satisfies an availability service level objective by using resources of a physical server to perform compression operations for the application in response to storage capacity of the storage system reaching a threshold.

12. The method of claim 7, wherein the backup virtual storage appliance satisfies a reliability service level objective by using resources of a physical server to store backup data for the application in response to the storage system not providing backup.

13. The method of claim 1, wherein the virtual storage appliance configuration comprises an endpoint virtual storage appliance and the virtual storage appliance action comprises using a direct-attached storage on a physical server to store data in order to satisfy the service level objective.

14. A system comprising:
a storage system including a storage controller and a mass storage subsystem;
a physical server coupled to communicate with the storage system, wherein the physical server is configured to host an application that requires access to the storage system; and
a storage management system, coupled to communicate with the storage system and the physical server, the storage management system including:
a monitoring engine configured to monitor the storage system;
a detection engine configured to determine, based on monitoring of the monitoring engine, whether the storage system is satisfying a service level objective for the application; and
a decision engine configured to:
reference scenario data corresponding to the service level objective for the application;

identify a virtual storage appliance configuration and a virtual storage appliance action corresponding to the scenario data;

instantiate a virtual storage appliance according to the virtual storage appliance configuration;

cause the virtual storage appliance action to be performed by the virtual storage appliance to satisfy the service level objective;

modify a data access path between the application and a physical resource to pass through the virtual storage appliance;

reroute the data access path such that the application directly accesses the physical resource based upon a detected change in resource usage at the virtual storage appliance or the application; and shut down the virtual storage appliance after rerouting the data access path, wherein the virtual storage appliance comprises a virtual machine on a hypervisor configured to execute the virtual machine.

15. The system of claim 14 wherein the scenario data comprises a mapping of scenarios to actions.

16. The system of claim 14 wherein the decision engine is further configured to instantiate the virtual storage appliance on the physical server in response to an indication from the detection that the storage system is not satisfying a service level objective for the application.

17. The system of claim 14 wherein the decision engine is further configured to shut down the virtual storage appliance in response to a determination that the storage system is able to satisfy the service level objective without the virtual storage appliance.

18. The system of claim 14 wherein the decision engine is further configured to reconfigure the virtual storage appliance in response to a change in resource usage by the application.

19. The system of claim 18 wherein reconfiguring the virtual storage appliance includes increasing resources allocated to the virtual storage appliance.

20. The system of claim 18 wherein reconfiguring the virtual storage appliance includes decreasing resources allocated to the virtual storage appliance.

21. The system of claim 14 wherein the virtual storage appliance comprises an end-point virtual storage appliance, a caching virtual storage appliance, a compression virtual storage appliance, or a backup virtual storage appliance.

22. The system of claim 14 wherein the physical server includes a hypervisor configured to manage server resources for applications and virtual storage appliances.

23. The system of claim 21, wherein the end-point virtual storage appliance, in response to the storage system not having capacity to store data for the application, uses resources of the physical server to store the data that an availability service level objective is satisfied.

24. The system of claim 21, wherein the caching virtual storage appliance, in response to the storage system not meeting a defined input/output rate according to the service level objective, uses resources of the physical server to cache data along a data access path between the application and the storage system to increase an input/output rate such that the input/output rate satisfies the defined input/output rate and the service level objective is met.

25. The system of claim 21, wherein the compression virtual storage appliance, in response to storage availability of the storage system reaching a threshold, uses resources of the physical server to perform compression operations for the application such that the storage availability is increased to meet a service level objective.

26. The system of claim 21, wherein the backup virtual storage appliance, in response to the storage system not providing sufficient backup, uses resources of the physical server to store backup data for the application, such that the backup data is available to satisfy a reliability service level objective.

27. A non-transitory computer readable storage device storing instructions executable by at least one processor to perform a method comprising:

monitoring, by a storage management system, a storage system to determine whether the storage system is satisfying a service level objective for an application;

determining, by the storage management system, that the storage system is not satisfying the service level objective;

in response to a determination that the storage system is not satisfying the service level objective:

referencing scenario data corresponding to the service level objective for the application;

identifying a virtual storage appliance configuration and a virtual storage appliance action corresponding to the scenario data;

instantiating, by the storage management system, a virtual storage appliance according to the virtual storage appliance configuration;

causing the virtual storage appliance action to be performed by the virtual storage appliance to satisfy the service level objective, the virtual storage appliance comprising a virtual machine on a hypervisor configured to execute the virtual machine;

modifying a data access path between the application and a physical resource to pass through the virtual storage appliance;

monitoring the virtual storage appliance and the application to detect a change in resource usage;

rerouting the data access path such that the application directly accesses the physical resource based upon a detected change in resource usage; and shutting down the virtual storage appliance after rerouting the data access path.

28. The non-transitory computer readable storage device of claim 27 wherein modifying the virtual storage appliance includes shutting down the virtual storage appliance in response to the storage system being able to satisfy the service level objective without help from the virtual storage appliance.

29. The non-transitory computer readable storage device of claim 27 wherein modifying the virtual storage appliance includes reconfiguring the virtual storage appliance in response to a determined event.

30. The non-transitory computer readable storage device of claim 27 wherein the virtual storage appliance is one of an end-point virtual storage appliance, a caching virtual storage appliance, a compression virtual storage appliance, or a backup virtual storage appliance.

31. The non-transitory computer readable storage device of claim 30 further comprising, heuristically determining what type of virtual storage appliance will satisfy the service level objective.

32. The non-transitory computer readable storage device of claim 27 wherein reconfiguring the virtual storage appliance includes allocating or releasing physical server resources associated with the virtual storage appliance to maintain performance above the service level objective.

33. A storage management system comprising:
a processor and memory;
a user interface configured to allow a user to specify a service level objective for an application;
a monitoring engine configured to gather data relating to service level objective performance of the storage management system;
a detection engine configured to detect, based on the data gathered by the monitoring engine, a defined event relating to the service level objective performance of the storage management and to trigger an alert in response to detecting the defined event;
scenario data corresponding to the defined event, the scenario data configured to define a virtual storage appliance configuration and one or more actions to be taken using a virtual storage appliance configured using the virtual storage appliance configuration in response to the alert from the detection engine; and
a decision engine configured to:
  implement, using the processor and memory, the one or more actions defined in the scenario data using a virtual storage appliance configured based on the virtual storage appliance configuration in communication with the storage management system through a network to perform storage system operations to satisfy the service level objective for the application;
  modify, using the processor and memory, a data access path between the application and a physical resource to pass through the virtual storage appliance;
  reroute the data access path such that the application directly accesses the physical resource based upon a detected change in resource usage at the virtual storage appliance or the application; and
  shut down the virtual storage appliance after rerouting the data access path, wherein
the virtual storage appliance comprises a virtual machine on a hypervisor configured to execute the virtual machine.

34. The storage management system of claim 33, wherein the monitoring engine is further configured to gather data relating to resource allocation and utilization of the storage management system and the virtual storage appliance.

* * * * *